Oct. 20, 1953 A. E. SMITH 2,655,860
ACTUATING MECHANISM FOR AUTOMATIC ELECTRIC TOASTERS AND THE LIKE
Filed Aug. 1, 1951 3 Sheets-Sheet 1
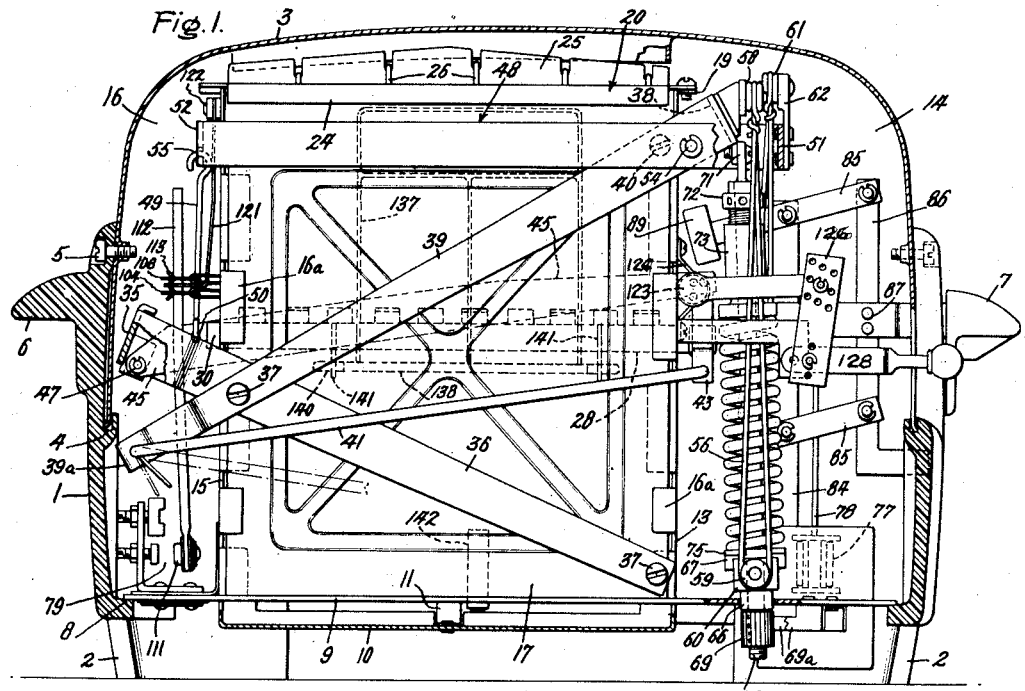
Inventor:
Archie E. Smith,
by *Sheridan Ross*
His Attorney.

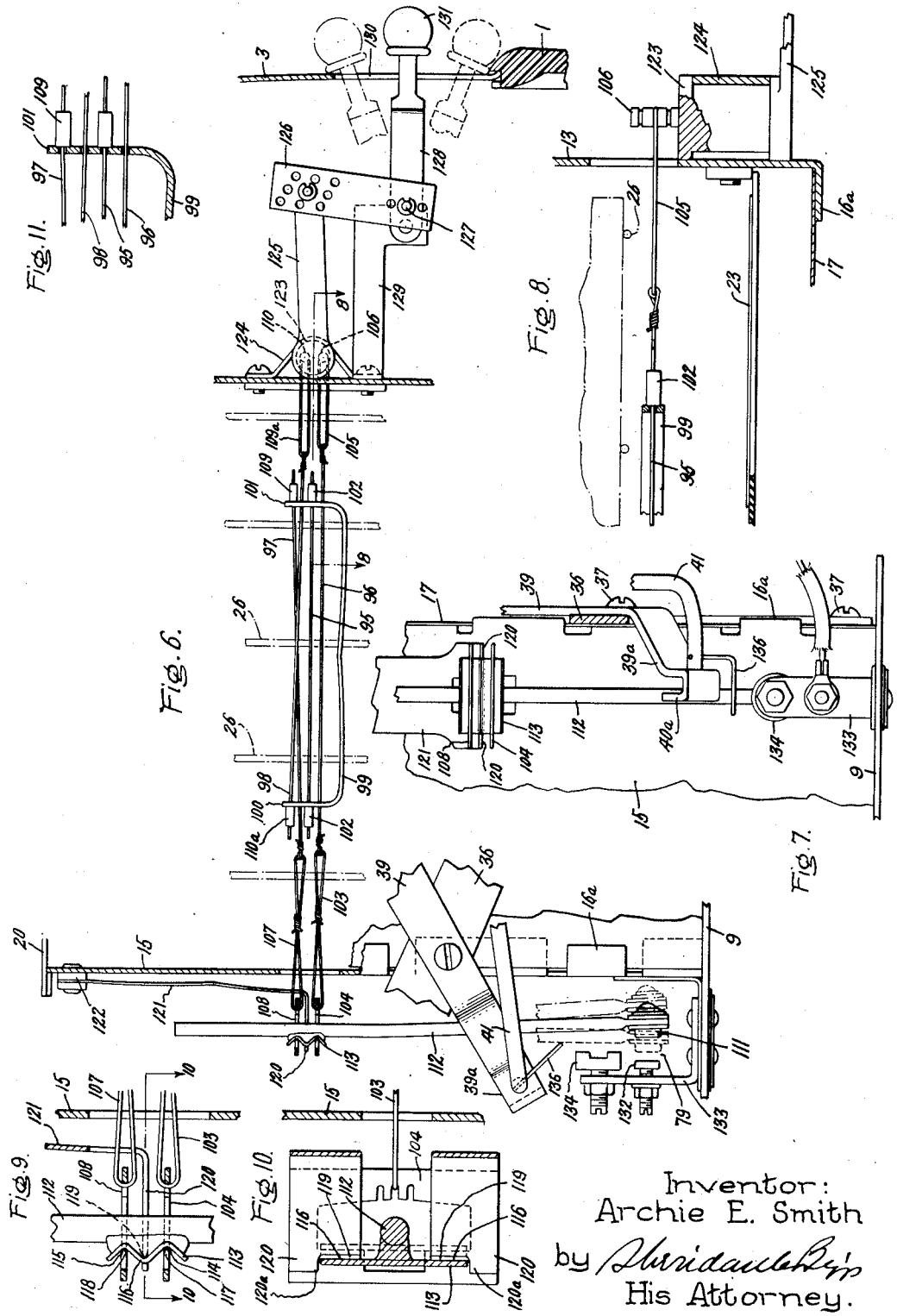

Oct. 20, 1953 A. E. SMITH 2,655,860
ACTUATING MECHANISM FOR AUTOMATIC ELECTRIC TOASTERS AND THE LIKE
Filed Aug. 1, 1951 3 Sheets-Sheet 3
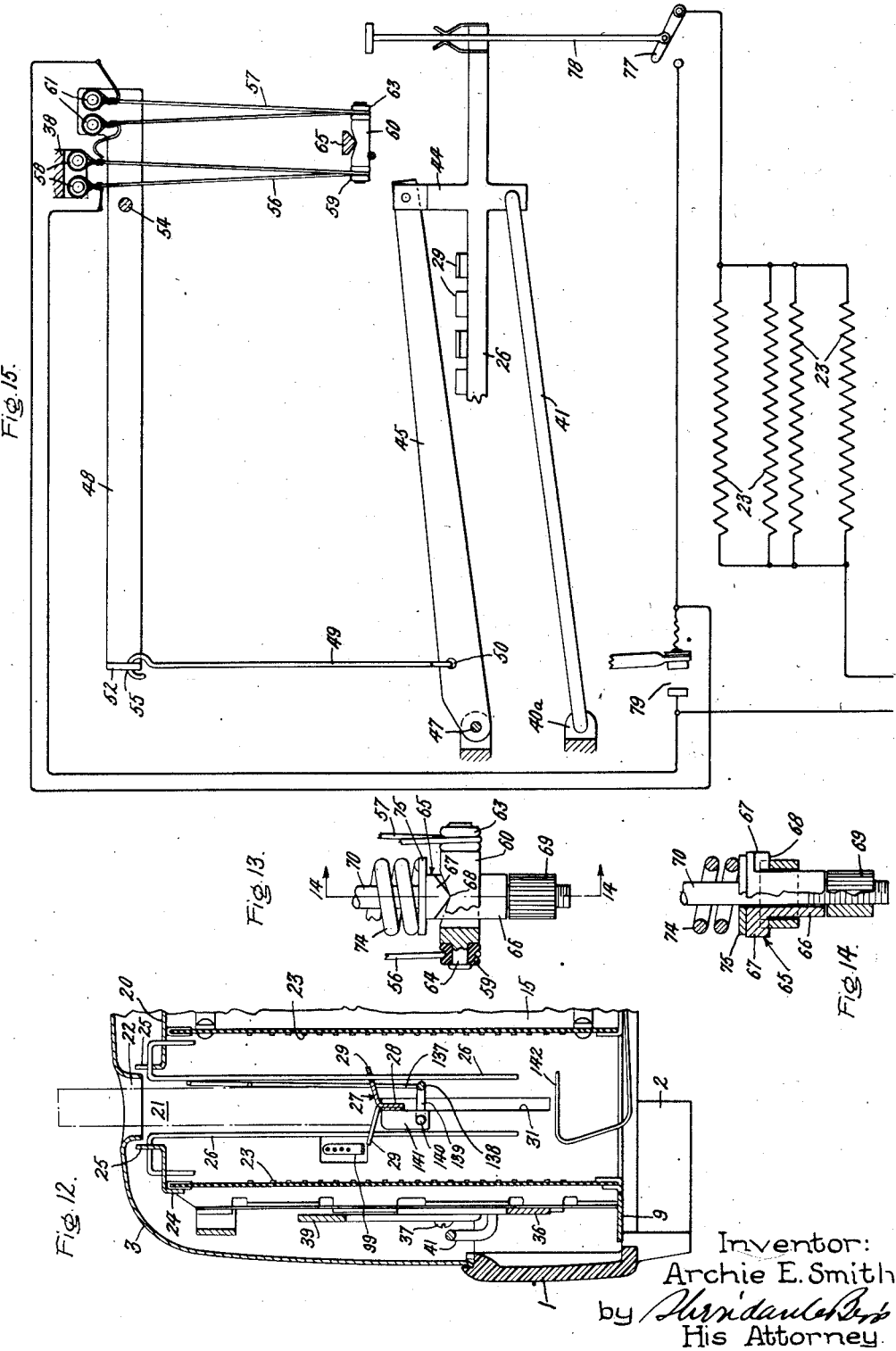
Inventor:
Archie E. Smith,
by *[signature]*
His Attorney.

Patented Oct. 20, 1953

2,655,860

UNITED STATES PATENT OFFICE 2,655,860

ACTUATING MECHANISM FOR AUTOMATIC ELECTRIC TOASTERS AND THE LIKE

Archie E. Smith, Stratford, Conn., assignor to General Electric Company, a corporation of New York Application August 1, 1951, Serial No. 239,774

2 Claims. (Cl. 99—329)

The present invention relates to actuating mechanisms for automatic electric toasters or the like. It is specifically illustrated and described as applied to an automatic electric toaster of the so termed "pop-up" type. It is to be understood, however, that as to certain aspects and features the invention is not limited thereto necessarily but may be used wherever found applicable.

Such toasters comprise generally one or more toasting chambers, each having electric heating units on its opposite side. In each toasting chamber is a movable bread rack on which the bread or other article to be toasted is positioned during the toasting operation. The bread rack or racks are connected to a suitable carrier. The bread rack and carrier normally occupy an upper or non-toasting position. During use, a slice of bread is placed on the bread rack, after which the bread rack and carrier are lowered to lower the slice to a position between the heating units, this being the toasting position. After the bread is toasted, the bread rack and carrier are raised to normal upper position, which brings the slice to a position, where, to some extent, it is above the top of the toaster as that it can be readily removed.

My invention has to do particularly with mechanism for lowering the bread rack or racks and the carrier to which they are attached from normal non-toasting position to toasting position, retaining them in lowered toasting position for a time interval long enough to effect the desired amount of toasting and then effecting the return of the rack or racks and the carrier to their upper normal non-toasting position.

An object of my invention is to provide an improved mechanism for lowering the bread rack or racks and the carrier, maintaining them lowered until the bread is toasted to the desired extent, and again raising them wherein the cycle is initiated and carried through by the simple closing of an electric switch.

A further object of my invention is to provide such a mechanism wherein no springs, hooks or latches are utilized in effecting the movements of the bread rack or racks and carrier and determining the duration of the toasting period.

Other objects and advantages of my invention will appear from the following specification.

According to my invention, I effect the lowering and raising of the bread rack or racks and the carrier by means of a heat-operated linearly expansible actuating motor which is attached to the carrier through an arrangement of levers and links, and I then control the duration of the toasting period and the initiating of the return movement of the bread rack or racks and carrier by means of a heat-operated differentially expansbile mechanism which is responsive to the temperature to which the bread surface is being subjected. In this connection, I have found that the temperature to which the bread surface is being subjected, i. e., the temperature of the bread surface, is a measure of the darkness or brownness of the bread. The actuating motor is operated by heat resulting from electric current flowing to the toaster heating units.

In the drawing, my invention is shown as applied to a toaster for toasting simultaneously two slices of bread, but it is to be understood that this is only by way of example and that it can be used in a toaster for a single slice of bread or for more than two slices.

In the drawing, Fig. 1 is a side elevation of a toaster embodying my invention, the outer casing being shown in section; Fig. 2 is an end elevation partly in section looking toward the right-hand end of Fig. 1; Fig. 3 is a sectional view taken on line 3—3 of Fig. 2; Figs. 4 and 5 are detail views of certain parts; Fig. 6 is a detail view of a temperature responsive mechanism which controls the toasting period and the return of the bread rack or racks from lower toasting position to normal non-toasting position; Fig. 7 is a detailed view looking at the left-hand end of Fig. 6; Fig. 8 is a detail view taken on line 8—8 of Fig. 6; Fig. 9 is a detail view on a larger scale of a pivot structure shown of Fig. 6; Fig. 10 is a sectional view taken on line 10—10 of Fig. 9; Fig. 11 is a detailed view showing more clearly a part of the temperature responsive mechanism; Fig. 12 is a transverse sectional view through one side of the toaster, the section being taken on line 12—12 of Fig. 1; Fig. 13 is a detail view partly in section of a lever mechanism; Fig. 14 is a sectional view taken on line 14—14 of Fig. 13; and Fig. 15 is a diagrammatic view comprising a wiring diagram and associated toaster parts.

Referring to the drawing, I indicates a rectangular base having supporting feet 2 at its four corners. It may be formed of a suitably molded material and constitutes the lower portion of the outside casing of the toaster. The upper portion of the outside casing comprises a sheet metal dome 3, the lower edges of which fit into ledge grooves 4 in base 1, and it is attached to the base by screws 5. At the two ends of base 1 are lifting handles 6 and 7, the handle 6 being integral with base 1 and the handle 7 being a separate member which forms also an operating handle for an electric switch as hereinafter explained. The end of the toaster at which handle 6 is located may be termed the rear end of the toaster and the other end may be termed the front end of the toaster.

At the four corners of base 1 are inwardly projecting corner ledges 8 which support a rectangular metal base frame 9, which is attached to the corner ledges by suitable screws (not shown). The base frame 9 supports the mechanism of the toaster. Supported beneath the rectangular metal base frame is a removable cover 10 which forms a crumb tray for the toaster. Cover 10 is attached to the frame by suitable spring clips, one of which is indicated in Fig. 1 at 11. It is arranged in spaced relation to the frame so as to leave passages for circulation of air up through the toaster. The inner edge of the front end of frame 9 is shown at 12 in Fig. 3. Supported by frame 9 at the front end of the toaster is a front wall 13 which is spaced from the front wall of the outer casing to define a front chamber 14 in which parts of the operating mechanism are located, and supported on frame 9 at the rear of the toaster is a similar rear wall 15 which is spaced from the rear wall of the outer casing to define a rear chamber 16 in which other parts of the mechanism are located. The vertical edges of walls 13 and 15 are provided with turn-in ears 16a which support side walls 17 and 18. Walls 13, 15, 17 and 18 enclose a rectangular toasting chamber, the bottom of which is covered by crumb tray 10. At their upper edges, front and rear end walls 13 and 15 are provided with ears 19 to which is attached a top wall 20. Top wall 20 is provided with two spaced slots 21 which extend longitudinally of the toasting chamber and through which slices of bread to be toasted are inserted. One of these slots is shown in Fig. 12. Metal dome 3 has openings 22 in line with slots 21.

Suitably supported between top wall 20 and bottom frame 9 are heating units 23 which are associated with slots 21, as shown clearly in Fig. 12. They may be attached to the top wall and bottom frame in any suitable manner, such as by the ears or clips 24. Along the side edges of slots 21, top wall 20 has upwardly projecting flanges 25 provided with notches in which are supported guide wires or rods 26 on which bread racks 27 slide. Each bread rack comprises a central web 28 from which a series of ears 29 project alternately in opposite directions, each ear having an opening through which a guide rod 26 loosely passes.

The rear ends 30 of webs 28 project through suitable vertical guide slots 31 (Fig. 12) in rear end wall 15 and their front ends 32 project through vertical guide slots 33 in front end plate 13. The ends 32 are firmly connected together by a carrier or crossbar 34 at points spaced somewhat inwardly from the ends of the carrier or cross bar.

The construction so far described is a known one. It is to be taken as typical of any suitable toaster construction comprising one or more toaster chambers, each provided with heating units and a bread rack, the bread rack being arranged to be lowered to bring a slice of bread supported on it down to toasting position between the heating units and raised to lift the slice of bread so its upper edge is above the top of the toaster. The construction is similar to that shown in the patent of Newell 2,367,044—January 9, 1945, which patent is assigned to the same assignee as is this application.

My invention has to do particularly with improved mechanism for lowering the bread racks 27 and crossbar 34 which form a rigid unitary structure and which may be termed the toaster carriage, maintaining them lowered for a period of time sufficient to effect the desired degree of toasting and then raising them again.

Positioned in rear chamber 16 and extending transversely thereof in spaced relation to end wall 15 is a rear hinge bar 35 fixed in place by two side arms 36 which extend diagonally along the sides of side walls 17 and 18 and are fastened thereto by screws 37. Positioned in the front chamber 14 and extending transversely thereof in spaced relation to and adjacent the top of wall 13 is a front crossbar 38 fixed in place by two side arms 39 which extend down diagonally across the side walls 17 and 18 and are fixed in place at their rear ends by two of the screws 37 and at their front ends by screws 40. The rear ends 39a of arms 39 project beyond end wall 15 into chamber 16, the ends being angled inwardly toward each other as best shown in Fig. 2 to provide fixed pivots 40a for the two turned-in ends of a U-shaped lever 41. The crossbar 42 of U-shaped lever 41 extends across wall 13 at the front end of the toaster and is pivotally connected to the two ends of carriage crossbar 34 by brackets 43. Projecting upwardly from the central portion of crossbar 34 and affixed thereto is a U-shaped bracket 44 between the arms of which is pivoted the front end of the lever 45. Lever 45 extends longitudinally of the toaster through a slot 46 in the front wall 13 and a similar slot in rear wall 15 and at its rear end is pivoted to rear end hinge bar 35, as is indicated at 47 in Fig. 1. The pivot 47 for the rear end of lever 45 and the pivots 40a for the rear ends of U-shaped lever 41 are in substantially vertical alignment. Together, levers 41 and 45 form a lever structure for the toaster carriage which extends from the rear to the front of the toaster, the lever structure being pivoted at the rear of the toaster and pivotally connected to the carriage at the front of the toaster. When the lever structure is in the position shown in Figs. 1 and 3, the toaster carriage is in its normal raised non-toasting position. By turning the lever structure on its pivots, the front end of the lever structure is lowered to move the toaster carriage from non-toasting position to toasting position.

The lever structure comprising levers 41 and 45 is connected to an actuating lever 48 by a link 49, the lower end of link 49 being pivotally connected specifically to lever 45 as shown at 50 in Fig. 1. Actuating lever 48 is in the form of a rectangular frame having front and rear bars 51 and 52 and side bars 53. It extends entirely around the toaster chamber in spaced relation to the walls thereof and at its front end is pivoted to side arms 39, as is indicated at 54. The upper end of link 49 is pivotally connected to rear bar 52 of actuating lever 48 at about its central point, as is indicated at 55.

From a consideration of the foregoing, it will be seen that the toaster carriage may be lowered by raising slightly the right-hand end of actuating lever 48, as viewed in Fig. 1, such movements serving to lower its left-hand end and through link 49 lower the right-hand end of the lever structure comprising levers 41 and

45 which are connected directly to the toaster carriage. The leverage arrangement is shown diagrammatically in Fig. 15 and from this figure it will be seen that there is provided a leverage arrangement whereby a very small movement of the right-hand end of actuating lever 48 is multiplied to provide a relatively large movement of the toaster carriage.

Movement of actuating lever 48 is effected by a linearly expansible electric motor comprising two heat expansible wires 56 and 57. Wire 56 is in the form of a loop, its two ends being fastened to insulating knobs 58 fixed to a bracket on stationary crossbar 38 and its loop passing around an insulator 59 on the end of a short lever 60. Wire 57 is in the form of a loop having its two ends fastened to insulating knobs 61 carried by a short bracket 62 which is fixed to and projects upwardly from the front end of lever 48 and its loop passing around an insulator 63 on the other end of lever 60.

Lever 60 is in the form of a rectangular frame (see Figs. 13 and 14) having pins 64 at its two ends on which insulators 59 and 63 are mounted. The side bars of lever 60 have V notches, the bottoms of which form pivot points for a fulcrum 65. Fulcrum 65 comprises a rectangular sleeve 66 having ears 67 on opposite sides, the undersides of the ears being shaped to provide pivot edges 68 which engage the points of the V notches in lever 60. Sleeve 66 projects loosely through the opening in lever 60 and at its lower end is adapted to engage an adjustable nut 69 threaded on the end of a fulcrum supporting rod 70. Sleeve 66 is made long enough to prevent spring 74 from cocking it and thus interfering with the sliding action of the sleeve on rod 70. Nut 69 is provided with suitable locking means for holding it in adjusted position. As shown in Fig. 4, this locking means comprises a pair of spring arms 69a which engage the knurled surfaces of nut 69. Nut 69 is adjusted so that when the toaster is at room temperature (i. e., not in use) there is a slight clearance between the lower end of sleeve 66 and the upper end of the nut for reasons pointed out hereinafter. The upper end of rod 70 is fixed to crossbar 38 as shown at 71. Rod 70 is formed of a suitable alloy which, within the working temperature range in the toaster, is substantially non-expansible, so that its length remains substantially the same irrespective of the temperature to which it is subjected. Such alloys are well known. I have found a nickel-iron alloy having a nickel content of about 42% satisfactory. At its upper end, rod 70 is provided with a shoulder against which rests the upper end of an axially extensible sleeve comprising two members 72 and 73 having threaded engagement with each other so that by turning the two members relatively to each other, the length of the sleeve can be adjusted. Positioned between fulcrum 65 and the extensible sleeve is a coiled spring 74 which surrounds rod 70. Its lower end bears against a washer 75 on the top surface of fulcrum 65 and its upper end bears against the under side of a spring rest 76, the upper end of which bears against the lower end of the axially extensible sleeve. Spring 74 is held in compression. It forms a yielding support or backing for fulcrum 65, and its compression may be adjusted by adjusting the length of the sleeve comprising members 72 and 73. The purpose in providing a yielding support for fulcrum 65 is to prevent overloading of the wires 56 and 57 due to temperatures lower than room temperature or to manual operation of the toaster carriage as will appear hereinafter.

The toaster carriage is heavy enough due primarily to crossbar 34, which in substance forms a biasing weight attached to the front end of the carriage, that it is biased towards the toasting position. It is held normally in non-toasting position by wires 56 and 57 which, when at room temperature, are of a length such that actuating lever 48 is held in the position shown in Figs. 1 and 3 and diagrammatically in Fig. 15. In this position, the toaster carriage is in its upper non-toasting position. When wires 56 and 57 are heated, they expand linearly permitting actuating lever 48 to turn counterclockwise on its pivots 54 as viewed in Fig. 15, and the toaster carriage to move downwardly to toasting position due to its weight. When wires 56 and 57 are permitted to cool, they will contract and through the leverage move the toaster carriage back to non-toasting position.

As shown in Fig. 15, wires 56 and 57 are connected in an electric circuit in series with the toaster heating units 23 and in such circuit is a manual control switch 77 to which is connected an operating rod 78, and a short circuiting switch 79 which is normally open and which, when closed, shorts wires 56, 57 out of the circuit but leaves heating units 23 in the circuit.

Referring particularly to Figs. 2 and 3, switch 77 is shown as being a known type mercury switch, the lower end of rod 78 being connected to it as is indicated at 80. In the position shown in Fig. 2, switch 77 is open. When the switch is turned in an anti-clockwise direction as viewed in Fig. 2 by a downward movement of rod 78, the switch is closed. Switch 77 is shown as being located in a suitable casing 81 which serves to protect it from the heat of the toaster. Switch 77 is closed and opened by the lowering and raising of handle 7, the handle being lowered manually to close the switch and raised automatically at the end of a toasting operation by upward movement of the toaster carriage to open the switch. To accomplish this, the upper end of rod 78 (see Fig. 3) is pivotally connected to an arm 82 which projects through an elongated slot 83 in base 1, handle 7 being fastened to its outer end. Arm 82 is pivotally mounted on a post 84 fixed to and projecting upwardly from switch casing 81 by means of two spaced links 85 each pivoted at one end on post 84 and at the other end to a link 86 to which arm 82 is fixed, as shown at 87. Link 86 has a toe 88 which is positioned in slot 83 and serves to assist in guiding the movement of the switch actuating means. Downward movement of the switch actuating means is limited by the lower end of link 86 engaging the top of switch casing 81. The inner end of upper link 85 projects beyond its pivot point on post 84 and is provided with a counterbalancing weight 89. This serves to normally bias handle 7 to its upper open switch position, as shown in Figs. 1 and 3, in which position arm 82 is in engagement with the top of the slot 83. The inner end of arm 82 is connected to the toaster carriage by a sliding friction clutch arranged to permit the arm to move downward to close switch 77 independently of the toaster carriage and then cause upward movement of the toaster carriage to open the switch. To this end, the inner end of arm 82 is connected to the toaster carriage by a pair of friction spring clips 90 (Fig. 5) which engage a vertical rod 91, the lower end of which is fixed to the toaster carriage as shown at 92 by having its end extended through an opening in the lower end of an arm 93 fixed to and depending from bar 34. On arm 82 is an upwardly projecting bracket 94 having an angular end provided with a guide opening through which rod 91 extends. When handle 7 is pressed down to close switch 77, spring clips 90 slide down along rod 91 and when in lowermost position with the end of link 86 in engagement with switch casing 81, the friction between the clip and the rod will hold the handle down and the switch closed. Now when the toaster carriage moves down to toasting position, rod 91 will slide down through the clips. When the toaster carriage moves back to non-toasting position, the friction between the clips and the rod will be sufficient to move handle 7 back to normal position, thus opening switch 77 and after the handle is back again to normal position, in which position it engages the upper end of slot 83, rod 91 will then slide on up through the spring clips.

Switch 79, the closing of which shortcircuits wires 56, 57 to terminate a toasting period, is operated by a differentially expansible mechanism actuated by the temperature of the surface of the bread being toasted. This mechanism (see Figs. 6 to 11) comprises two linearly expansible wires 95 and 96 and two substantially non-expansible wires 97 and 98, the wires being mounted in a U-shaped spring frame 99 also formed from substantially non-expansible metal. The arms 100 and 101 of spring frame 99 are held under compression by expansible wire 95, the ends of which pass loosely through openings in arms 100 and 101 and have holders 102 fixed thereto which bear against the outer surfaces of the arms. When wire 95 expands linearly due to being heated, arms 100 and 101 tend to follow the movement, spreading apart somewhat. When wire 95 contracts linearly, the two arms 100 and 101 are pulled toward each other. Expansible wire 96 extends loosely through holes in arms 100 and 101. Its left-hand end is connected by a non-expansible looped wire 103 to a rectangular pivot frame 104 and its other end is connected by a non-expansible looped wire 105 to a post 106. Non-expansible wire 97 extends loosely through holes in arms 100 and 101 and has its left-hand end connected by a non-expansible looped wire 107 to a rectangular pivot frame 108. Its other end is provided with a holder 109 which is fixed on the end of the wire and bears against the outer surface of arm 101. Non-expansible wire 98 also extends loosely through holes in arms 100 and 101. Its right-hand end is connected by a looped wire 109a of non-expansible metal to a post 110 similar to post 106. Its other end has a holder 110a fixed thereon which bears against the outer surface of arm 100. The four wires 95, 96, 97 and 98 are held spaced relatively to each other by the arms of spring frame 99. It will be noted that the spring frame and all the wires associated with it are formed of substantially non-expansible metal with the exception of the two wires 95 and 96. A suitable non-expansible metal is a nickel-iron alloy such as that from which rod 70 is made.

The movable contact 111 of shortcircuiting switch 79 is carried on the lower end of a vertical rod 112 which adjacent to its upper end is provided with a pivot plate 113 rigidly fixed thereto and shaped to provide three vertically spaced pivot seats 114, 115 and 116. Pivot seats 114 and 115 face toward the left as viewed in Figs. 6, 9 and 10 and form seats for knife edges 117 and 118 on rectangular frames 104 and 108, respectively. Pivot seat 116 faces toward the right and forms a seat for two spaced knife edges 119 carried by two furcations 120 on the lower end of a leaf spring 121 and extending at right angles thereto. At its upper end leaf spring 121 is fixed to end wall 15 as shown at 122. The furcations straddle rod 112 as shown clearly in Fig. 10. Ears 120a at the front ends of furcation 120 serve to hold pivot plate 113 against transverse movement relatively to the furcations. With this arrangement, it will be seen that rod 112 is pivoted on the free ends of furcations 120 at a point between pivot plates 104 and 108 and when turned on its pivot moves contact 111 to close and open switch 79. Pivot seat 116 is held against knife edges 119 by wires 96 and 97, leaf spring 121 having a strength sufficient to place the parts under the desired tension.

Posts 106 and 110 to which the right-hand ends of wires 96 and 98 are connected are attached to the end of a rotatable drum 123 held by a surrounding strap 124 attached to the outside of end wall 13. The posts are in substantially vertical alignment. Adjustable means is provided for turning drum 123 comprising an arm 125 on the drum which is pivotally connected at its outer end to one end of a link 126, the other end of which is pivotally connected as shown at 127 to an adjusting or hand lever 128. The inner end of hand lever 128 is pivoted on the outer end of a bracket 129 fixed on end wall 13 and its outer end extends out through a slot 130 in dome 3 and is provided with a hand knob 131 for manually turning lever 128. A number of spaced holes are provided in link 126 for use in adjusting the positions of the pivot points. With a linkage as shown, it will be seen that a relatively large movement of hand lever 128 effects a very small turning movement of drum 123.

The fixed contact of switch 79 is indicated at 132. It is carried by a bracket 133 fixed to base 9. To effect a quick make and break of the contacts a permanent magnet 134 is provided adjacent to contacts 132. The operation of a permanent magnet of this type is well understood. During the closing movement of the switch when rod 112 reaches a predetermined position with respect to contact 132, permanent magnet 134 functions to quickly turn the rod to close the circuit.

In the functioning of the toaster, it is desirable in order to provide stable operation and prevent fluttering of the contacts of switch 79, which might effect a pumping action, that switch 79 should open after switch 77 opens. To accomplish this there is provided on lever 41 an arm 136 which may be formed to a bent wire and which functions upon the initial movement of the toaster carriage from toasting position toward non-toasting position to engage rod 112 to effect a quick initial opening movement of switch 79 just after switch 77 has been opened.

Referring particularly to Fig. 6, the parts are shown in positions such as they occupy when switch 79 is open and expansible wires 95 and 96 are at a lower temperature. The arms 100 and 101 of frame 99 are held in fixed position against expanding movement by expansible wire 95. The pull of expansible wire 96 on its rectangular pivot frame 104 is counterbalanced by the pull of spring arm 101 on pivot frame 108 to which it is connected by wire 97; and that in turn is determined by expansible wire 95. The switch is held in open position and the parts are held under tension and in a balanced condition by the stress of leaf spring 121. Now when the structure is subjected to heat, such as the heat of bread in a toasting operation, wires 95 and 96 expand linearly. The expansion of wire 95 functions to release arms 100, 101 for movement outwardly relative to each other. However, the arm 100 is held from movement by wire 98, which is fixed to post 110. As a result, arm 100 remains stationary and arm 101 moves toward the right by the amount permitted by the expansion of wire 95. This pulls on wire 97 tending to turn rod 112 on its pivot in a clockwise direction. At the same time the expansion of wire 96 serves to permit such turning movement. As a result, the expansion of the two wires 95 and 96 effects a turning movement of rod 112 and eventually closing of switch 79. When wires 95 and 96 cool again and contract, the same operation occurs except in the opposite sense, the contraction of wire 95 serving to move arm 101 toward the left and the contraction of wire 96 serving to pull toward the right on pivot frame 104. This results in a turning of rod 112 in a direction to open switch 79. It will be noted that the connection of wire 95 to arm 101 is spaced from the free end of the arm while the connection of wire 97 to arm 101 is at the outer end of the arm. This provides a multiplying leverage whereby a unit expansion of wire 95 will be multipled to effect a greater movement of wire 97 since the free end of arm 101 will move more than the midpoint where wire 95 is attached to it. In the present instance, a multiplying leverage of about two to one is indicated. This may be increased or decreased as found desirable by varying the length of the arm and the points of connection.

Considering expansible wires 95 and 96, it will be seen that wire 96 is connected directly to rod 112 on one side of its pivot point and that wire 95 is connected to it indirectly through the intermediary of spring arm 101 on the other side of its pivot point. This arrangement serves to make the expansible wires function together to turn the rod, each when expanding and contracting operating to effect a turning movement of the rod in the same direction.

As stated above, wires 97 and 98 are formed from a metal which is substantially non-expansible within the operational temperature of the toaster. However, they may have a very small coefficient of linear expansion. Accordingly, the actual effective movement is the difference between the expansion of wires 95, 96 and wires 97, 98. For this reason I term the structure a differentially expansible mechanism.

During normal operation, arm 100 is a fixed point. Its function is to permit adjustment of the setting of the differentially expansible mechanism. In Fig. 6, lever 128 is shown as being set in a mid position. A movement of it upward turns drum 123 in a counterclockwise direction as shown in Fig. 6, thus moving post 110 toward the left and post 106 toward the right. Movement of post 106 toward the right because of its connection by wire 96 to pivot frame 104 tends to turn rod 112 in a counterclockwise direction on its pivot so as to move contact 111 further from fixed contact 132. This turning movement can take place since the simultaneous movement of post 110 toward the left releases frame 99 at holder 110a thus permitting pivot frame 108 and wire 97 to move toward the left, the frame 99 and the wire 95 being moved along therewith. Thus, the switch is adjusted so that contact 111 stands further from fixed contact 132. On the other hand, a movement of knob 131 downward from the position shown in Fig. 6 turns drum 123 in a clockwise direction which affects an adjustment of the parts to move contact 111 of switch 79 toward fixed contact 132. These adjustments function to vary the temperatures to which wires 95 and 96 are required to be heated in order to expand sufficiently to effect the closing of switch 79 so that by such adjustments the color of the toast can be varied.

The differentially expansible mechanism is located in one of the toasting chambers between a heating unit 23 and the adjacent guide wires or rods 26. Its position with respect to rods 26 may be adjusted by means of several notches in pivot frames 104 and 108 and several corresponding grooves in posts 106 and 110. In the present instance, each pivot frame is provided with three notches as shown in frame 104 in Fig. 10 and each post is provided with three grooves as shown in post 106 in Fig. 8. By placing wires 103 and 107 in different notches and wires 105 and 109a in corresponding grooves, the differentially expansible mechanism may be moved closer to or farther from the surface of the bread being toasted. Its location is shown in Fig. 12. When a slice of bread is to be toasted, it is desirable in order to obtain uniform results, that the surface of the slice of bread on the one side be positioned always in the same position with respect to the differentially expansible mechanism irrespective of the thickness of the slice. To insure this there is provided a bread pusher in the toaster chamber which, when the carriage is lowered, operates to move the bread to a position where it is against the guide rods adjacent to the differentially expansible mechanism and to hold it there. To this end, there is provided in the toasting chamber adjacent to which the differentially expansible mechanism is located, a rectangular wire frame 137 which is positioned in such toasting chamber as shown in Figs. 1 and 12. At its lower end it is fastened to the crossbar 138 of a U-shaped wire frame, the arms 139 of which have inturned ends 140 which are pivotally supported in openings in the lower ends of bracket arms 141 fastened to web 28 of the bread rack. The weight of the U-shaped wire frame and the rectangular frame are such as to bias the rectangular frame 137 to a position as shown in Fig. 12 where the frame rests against the guide rods on the side of the toasting chamber remote from the differentially expansible mechanism. When the bread rack is lowered in the toasting chamber as it approaches the end of its movement, the crossbar 138 of the U-shaped frame strikes a spring stop 142 which serves to turn it counterclockwise as viewed in Fig. 12 so as to move the upper end of wire frame 137 toward the left (Fig. 12) to force the slice being toasted into contact with the guide rods 26 adjacent to the differentially expansible mechanism. Yielding stop 142 serves to compensate for varying thickness of slices since after the slice engages guide rods 26, the stop will yield to permit additional downward movement.

By reason of their location in the toasting chamber, the expansible wires 95 and 96 of the differentially expansible mechanism are subjected on the one side to the radiant heat from the adjacent surface of the bread being toasted, and on the other side to heat from the heating unit wires and from the insulation (usually mica) on which they are strung. In addition, the expansible wires are subjected to convection cooling by the stream of air passing up through the toasting chamber, it being well understood that in a toaster of the type disclosed herein there is a convection air stream flowing up through the toasting chamber or chambers which can take place due to the openings at the bottoms and tops of the toasting chambers. The temperature of the expansible wires at any time is the resultant of the several heat defining means to which they are subjected. Of these several heat defining means, the convection air current is the predominant one. And this is especially true because of the relatively small diameter of wires 95 and 96. The air stream temperature in the region of the toast varies with the distance of the air from the toast and the height along the toast. At any fixed region in the toasting chamber, such as that at which the differentially expansible mechanism is shown as being located in Fig. 12, the temperature of the wires 95 and 96 will vary with and be primarily set by the temperature of the air flowing over them. And this in turn is fixed primarily by and bears a direct relation to the temperature of the surface of the bread being toasted and across which the air is flowing. It follows therefore that the temperature of the wires is a fairly close measure of the temperature of the surface of the bread being toasted; and the temperature of the surface of the bread being toasted is a measure of the darkness or brownness of the bread. Hence, the temperature of the wires represents the degree of toasting.

In connection with the differentially expansible mechanism, the use of the two expansible wires one connected above the pivot 119 for rod 112 and the other below the pivot is an important feature of the construction since by this arrangement, I provide an actuating means for the switch 79 which is not affected by expansion and contraction of the toaster frame which occurs during operation of the toaster, since any such expansion to the extent it affects the expansible mechanism, affects both connections alike leaving them always in the same balanced condition.

When the toaster is to be used, the slices of bread to be toasted are placed on the toaster racks in the respective toasting compartments. Or if only a single slice is to be toasted, it is placed, of course, in the compartment having the differential temperature responsive device. In Fig. 12, a slice of bread is indicated in outline by the dot and dash lines. The lever 128 is then set for the extent of toasting desired, suitable markings being on the toaster hood 3 adjacent slot 130 to indicate the setting of lever 128 for the desired toast color. For example, the indicia light, medium and dark may be used. Next, handle 7 is lowered to close switch 77, it being moved downward until the lower end of link 86 strikes the top of switch housing 81. During this movement, the friction clutch spring clips 90 slide along vertical rod 91, the friction being not sufficient to cause a movement of the toaster carriage. When switch 77 is closed, a circuit is closed through the wires 56 and 57 and the heating units in series as is clear from Fig. 15. The relative resistances of wires 56 and 57 and the toaster units are preferably such that there is a relatively small voltage drop across the resistance wires 56 and 57, for example, a voltage drop of the order of 8 volts. As wires 56 and 57 heat due to current passing through them they start to expand. The initial expansion is taken up by the slight space between the lower end of sleeve 66 and nut 69, spring 74 causing pivot 65 and sleeve 66 to take up the expansion until the bottom of sleeve 66 strikes the top of nut 69. After this clearance is taken up, pivot 65 becomes fixed and upon further expansion lever 60 turns on its pivot to permit the left-hand end of lever frame 48 to lower and through link 49 and levers 41 and 45 to lower the toaster carriage, the movements taking place because of the weight of the parts. The bread now begins to toast and the expansible wires 95 and 96 of the differentially expansible mechanism start to heat due primarily to the convection air currents as already explained. As soon as the surface of the bread being toasted reaches the temperature for which lever 128 is set, the differentially expansible mechanism operates in the manner already described to effect the closing of switch 79. Closing switch 79 cuts expansible wires 56 and 57 out of the circuit but leaves the wires of the heating units still in circuit. The expansible wires 56 and 57 begin now to cool whereupon they contract and as they contract, operate the leverage mechanism to move the toaster carriage back to normal non-toasting position.

As the toaster carriage moves back to non-toasting position, during its initial movement friction clutch spring clips 90 grip rod 91 sufficiently so that lever 82 is raised and switch 77 is opened. As soon as lever 88 strikes the upper end of slot 83, its further movement is arrested after which rod 91 slides through between the spring clips 90. Shortly after switch 77 opens, the arm 136 engages vertical rod 112 to effect a quick initial opening movement of contact 111 away from fixed contact 132, thus opening short circuiting switch 79. As the temperature of the expansible wires 95 and 96 continues to decrease, the distance between movable contact 111 and fixed contact 132 will continue to increase, the distance depending upon the temperature within the toasting chamber.

If additional bread is placed in the toaster and the operation is repeated while the toaster chamber is still at a temperature higher than room temperature, such temperature being normal, switch contact 111 will be closer to switch contact 132 at the instant the bread is dropped in. The contact 111 will, however, immediately move away from contact 132 as the wires of the differential expansible mechanism are cooled by the bread surface. Later, as the toasting operation continues the toast surface and therefore the differential expansible mechanism both rise in temperature. The rate of rise will depend on the temperature of the toasting chamber, which is, of course, affected by line voltage and the past history of the chamber. Thus, the differential expansible mechanism compensates automatically for the toaster temperature at the time the toasting cycle is started. In other words, it sets movable contact 111 with respect to fixed contact 132 in accordance with the temperature of the toast surface irrespective of the temperature in the toasting chamber.

When the toaster carriage is lowered, frame 137 functions to push the slice of bread against the guide rods 26 which are adjacent the differentially expansible mechanism. Thus, irrespective of the thickness of the slice of bread, the one surface will be positioned always the same distance from the expansible wires 95 and 96.

Because of this arrangement, uniform results will be obtained in the toasting of successive slices of bread.

In connection with the operation of the linearly expansible motor, I prefer not to use the entire heating range of wires 56 and 57 in effecting the movements of the carriage. Since, if load is placed on them when they are at a higher temperature, at which time they are not as strong as when at a lower temperature, they may be subject to creep, i. e., slow deformation under stress. Any permanent lengthening or set in the wires would affect adversely the operation of the toaster, requiring readjustments which could not be made by the ordinary user. Accordingly, I prefer to arrange the connections so that a movement of the carriage is completed before the wires reach their maximum temperatures and length. This means that during the final heating and expansion of the wires, they slacken with respect to lever 60 so that upon contracting again, they do not pick up load until they have cooled down enough to take up the slack. For example, assuming that the final high temperature is of the order of 1200° F., I may arrange the parts so that the movement of the carriage is completed when the wires have reached a temperature of the order of 900° F., and slacken during further increase in temperature. This means that they must cool down from whatever high temperature they may have reached, for example 1200° F. to 900° F. before picking up load. To insure complete movement of the carriage when a toasting period is started with the toaster chamber at a temperature higher than normal or room temperature, I prefer not to use the initial heating of the wires in effecting carriage movement. It is to obtain this result that the space between sleeve 66 and nut 69 is provided, as referred to above. As a numerical example, I may arrange the parts so that during the initial heating of the wires from a normal or room temperature of the order of 80° F. to 300° F., the expansion of the wires is taken up by the clearance between sleeve 66 and nut 69. Hence, during the period while the wires are heating to a temperature of the order of 300° F., no movement of the carriage takes place. Then upon continued heating of the wires from a temperature of the order of 300° F. to a temperature of the order of 900° F., the carriage is moved from its non-toasting to its toasting position, after which during further expansion the wires slacken. This serves also to equalize the periods of heating and cooling of the wires during which no carriage movement takes place. If a second toasting operation is started before the toaster has cooled down to normal room temperature, for example if it has cooled down to only 300° F. at which temperature there may be no clearance between sleeve 66 and nut 69, then when wires 56 and 57 begin to heat and expand again, movement of the carriage toward toasting position will start immediately.

Also, in connection with the linearly expansible motor, the provision of a yielding backing for fulcrum 65 is a desirable feature since it prevents putting undue stress on wires 56 and 57 if they contract beyond a certain amount, a thing that may occur when a toaster is subjected to a low temperature at any time. In other words, spring 74 serves to limit the stress which can be placed on the wires due to their contraction for after a certain value is reached, the spring 74 yields. Also, should the toaster carriage be operated manually at a time when hood 3 has been removed, or at any other time, by pressing down on the left hand end of lever 48, for example, spring 74 will yield to permit movement of the carriage.

What I claim as new and desire to secure by Letters Patent of the United States is:

1. In an automatic electric toaster having a toaster frame, means including heating units on the toaster frame which defines a toasting chamber, and a carriage in the toasting chamber movable between non-toasting and toasting positions, mechanism responsive to surface temperature of a slice of bread being toasted for effecting movement of the carriage from toasting to non-toasting position comprising a U-shaped spring frame, two expansible wires on which said spring frame is supported, said wires and spring frame being positioned in said toasting chamber, a rod, a yielding pivot for the rod carried by the toaster frame, an adjustable support on the toaster frame, means connecting one of said expansible wires to said rod on one side of said pivot and to said adjustable support, means connecting the other of said expansible wires to the arms of said U-shaped frame, a non-expansible wire connecting one of said U-shaped arms to said rod on the other side of said pivot, and a non-expansible wire connecting the other arm of said U-shaped frame to said adjustable support.

2. In an automatic electric toaster having a toaster frame, and means including heating units on the toaster frame which defines a toasting chamber, mechanism for effecting a toaster operation comprising a switch rod, a pivot on the toaster frame for said rod, a U-shaped frame having spring arms located in the toasting chamber, an expansible wire which connects said spring arms and holds them under tension, means holding one of said spring arms in fixed position, a non-expansible wire connecting the other spring arm to said rod on one side of its pivot, and an expansible wire which connects at one end to said rod on the other side of its pivot and at its other end to said toaster frame, said wires extending through the toasting chamber and serving as a support for said U-shaped frame.

ARCHIE E. SMITH.

References Cited in the file of this patent

UNITED STATES PATENTS

| Number | Name | Date |
|---|---|---|
| 358,728 | Campbell | Mar. 1, 1887 |
| 954,682 | Low et al. | Apr. 12, 1910 |
| 1,540,628 | Hurxthal et al. | June 2, 1925 |
| 2,030,932 | Persons | Feb. 18, 1936 |
| 2,099,210 | Ireland | Nov. 16, 1937 |
| 2,179,422 | Myers et al. | Nov. 7, 1939 |
| 2,301,070 | Myers | Nov. 3, 1942 |
| 2,337,098 | Gomersall | Dec. 21, 1943 |
| 2,570,453 | Huck | Oct. 9, 1951 |
| 2,590,334 | Loomer | Mar. 25, 1952 |